(12) United States Patent
Kim

(10) Patent No.: US 8,714,603 B2
(45) Date of Patent: May 6, 2014

(54) ENERGY ABSORBER FOR VEHICLE

(75) Inventor: Hyun Gyung Kim, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/493,517

(22) Filed: Jun. 11, 2012

(65) Prior Publication Data

US 2013/0147216 A1  Jun. 13, 2013

(30) Foreign Application Priority Data

Dec. 8, 2011 (KR) .................. 10-2011-0130850

(51) Int. Cl.
*B60R 19/22* (2006.01)

(52) U.S. Cl.
USPC .. 293/120; 293/132; 296/187.09; 296/187.11

(58) Field of Classification Search
USPC ............... 293/120–122, 109, 132, 135, 136; 296/187.03, 187.04, 187.09, 187.11
See application file for complete search history.

(56) References Cited

U.S. PATENT DOCUMENTS

| | | | | |
|---|---|---|---|---|
| 4,348,042 A * | 9/1982 | Scrivo | ........................ | 293/120 |
| 4,457,547 A * | 7/1984 | Sekiyama et al. | ............ | 293/110 |
| 4,762,352 A * | 8/1988 | Enomoto | ...................... | 293/120 |
| 5,096,243 A * | 3/1992 | Gembinski | ................... | 293/120 |
| 5,139,297 A * | 8/1992 | Carpenter et al. | ............ | 293/132 |
| 5,265,925 A * | 11/1993 | Cox et al. | ...................... | 293/120 |
| 6,890,009 B2 * | 5/2005 | Murata et al. | ................. | 293/109 |
| 7,059,642 B2 * | 6/2006 | Ohno et al. | .................... | 293/120 |
| 7,226,097 B2 * | 6/2007 | Adachi et al. | ................. | 293/120 |
| 7,325,861 B2 * | 2/2008 | Zacheiss et al. | ......... | 296/187.09 |
| 7,390,039 B2 * | 6/2008 | Adachi et al. | ................. | 293/120 |
| 7,575,259 B2 * | 8/2009 | Hasegawa | ..................... | 293/120 |
| 7,581,769 B2 * | 9/2009 | Wakabayashi et al. | ....... | 293/109 |
| 7,896,410 B2 * | 3/2011 | Morikawa et al. | ........... | 293/120 |
| 7,946,636 B2 * | 5/2011 | Goda et al. | .................... | 293/120 |
| 2004/0056491 A1 * | 3/2004 | Murata et al. | ................. | 293/120 |
| 2004/0174024 A1 * | 9/2004 | Murata et al. | ................. | 293/109 |
| 2006/0076799 A1 * | 4/2006 | Tanabe | ..................... | 296/187.03 |
| 2006/0145490 A1 * | 7/2006 | Yamaguchi et al. | ......... | 293/109 |
| 2007/0114803 A1 * | 5/2007 | Takahashi et al. | ............ | 293/102 |
| 2010/0038922 A1 * | 2/2010 | Takahashi et al. | ............ | 293/117 |
| 2010/0038923 A1 * | 2/2010 | Toneatti et al. | ............... | 293/120 |

FOREIGN PATENT DOCUMENTS

| | | |
|---|---|---|
| JP | 2004276694 A | 10/2004 |
| JP | 2007326481 A | 12/2007 |
| JP | 4121074 B2 | 7/2008 |
| JP | 2010173596 A | 8/2010 |

* cited by examiner

*Primary Examiner* — Glenn Dayoan
*Assistant Examiner* — Gregory Blankenship
(74) *Attorney, Agent, or Firm* — Morgan, Lewis & Bockius LLP

(57) ABSTRACT

An energy absorber for a vehicle includes a structure with an I-shaped cross-sectional structure, preventing collision energy from causing a buckling phenomenon. Particularly, the wiring for an electric wire connected to a sensor can be realized by making use of extra space.

6 Claims, 2 Drawing Sheets

ENERGY ABSORBER FOR VEHICLE

CROSS-REFERENCE TO RELATED APPLICATIONS

The present application claims priority of Korean Patent Application Number 10-2011-0130850 filed Dec. 8, 2011, the entire contents of which application is incorporated herein for all purposes by this reference.

BACKGROUND OF INVENTION

1. Field of Invention

The present invention relates generally to energy absorbers for vehicles and, more particularly, to an energy absorber which is installed between a bumper cover and a back beam of a vehicle.

2. Description of Related Art

Generally, one way of protecting vehicle bodies in vehicle collisions and, moreover, protecting passengers, as shown in FIG. 1 is to provide a bumper cover 1 and a back beam 2 on each of the front and rear ends of a vehicle and to install an energy absorber 3 between the bumper cover 1 and the back beam 2 to absorb collision energy.

The shape of the energy absorber 3 itself changes in response to the collision energy and it absorbs the shock.

Typically, most conventional energy absorbers including the energy absorber 3 have a C-shaped cross-sectional structure. However, in the case of the conventional energy absorber 3 having the C-shaped cross-sectional structure, a cross-sectional length (designated by the dashed line L1 of FIG. 1) from an upper end to a lower end is excessively long. Thus, a buckling phenomenon easily arises attributable to collision energy.

The buckling phenomenon of the energy absorber 3 involves damage to the peripheral parts. Due to the damaged peripheral parts, the energy absorber 3 may not be able to absorb a sufficient amount of collision energy. Particularly, when the vehicle collides with a pedestrian, parts that are broken by the buckling phenomenon of the energy absorber 3 may exacerbate the degree of injury to the pedestrian.

Furthermore, in the case of a vehicle provided with a sensor installed in the bumper cover 1, an electric wire must be connected to the sensor and be disposed in the space between the bumper cover 1 and the energy absorber 3. However, the energy absorber 3 having the C-shaped cross-sectional structure cannot provide by itself a path along which the electric wire connected to the sensor can be disposed between the bumper cover 1 and the energy absorber 3. Therefore, there is a disadvantage in that a separate path to install the electric wire must be configured.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the prior art. Various aspects of the present invention provide for an energy absorber for a vehicle which can prevent collision energy from causing a buckling phenomenon, thus preventing peripheral parts from being damaged, thereby markedly enhancing the ability to absorb the collision energy and to protect a pedestrian.

Various aspects of the present invention provide for an energy absorber for a vehicle which is configured such that in the case of a bumper cover provided with a sensor, a path on which an electric wire connected to the sensor can be disposed is defined by the shape of the absorber itself.

Various aspects of the present invention provide for an energy absorber installed between a bumper cover and a back beam of a vehicle to absorb a collision energy. The energy absorber includes: a top absorption part extending in a lateral direction of the vehicle, the top absorption part being oriented such that a first surface and a second surface thereof respectively face the bumper cover and the back beam; a bottom absorption part disposed below the top absorption part, the bottom absorption part having a first surface and a second surface that are respectively oriented in same directions as the first and second surfaces of the top absorption part; and a medial absorption part connecting the top absorption part to the bottom absorption part. The top and bottom absorption parts and the medial absorption part are integrated into a single body in an I-shaped cross-sectional shape.

Further, a primary shock absorption space may be defined among the medial absorption part and the first surfaces of the top and bottom absorption parts, and a secondary shock absorption space may be defined among the medial absorption part and the second surfaces of the top and bottom absorption parts.

In addition, an electric wire may be arranged in the primary shock absorption space and the secondary shock absorption space, the electric wire being connected to a sensor installed in the bumper cover.

The top and bottom absorption parts and the medial absorption part may be of a foamed product that is formed into a single body and is made of synthetic resin.

The synthetic resin may comprise polyolefin resin foam.

Furthermore, an apparent density of the top and bottom absorption parts and the medial absorption part may range from $0.025 \text{ g/cm}^2$ to $0.035 \text{ g/cm}^2$.

The shapes of the top absorption part, the bottom absorption part and the medial absorption part may satisfy Equations 1 and 2, $$2 \text{ mm} < R/H1 \text{ or } R/H2 < 4 \text{ mm} \qquad \text{Equation 1)}$$

$$2 \text{ mm} < D/T1 \text{ or } D/T2 < 4 \text{ mm} \qquad \text{Equation 2)}$$

where, R denotes a length from the first surface of the top or bottom absorption part to the second surface thereof, H1 denotes a length from the first surface of the top or lower bottom absorption part to the medial absorption part, H2 denotes a length from the second surface of the top or lower bottom absorption part to the medial absorption part, D denotes a height from an a top surface of the top absorption part to a lower bottom surface of the lower bottom absorption part, T1 bottom denotes a thickness of the top absorption part, and T2 denotes a thickness of the bottom absorption part.

An energy absorber for a vehicle according to the present invention has an I-shaped cross-sectional structure so that collision energy is prevented from causing a buckling phenomenon, thereby markedly enhancing the ability to absorb the collision energy and protect a pedestrian. Particularly, an electric wire that is connected to a sensor can be arranged in primary and secondary shock absorption spaces which function as extra space. Hence, the present invention does not require a separate installation space within which to dispose the electric wire.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
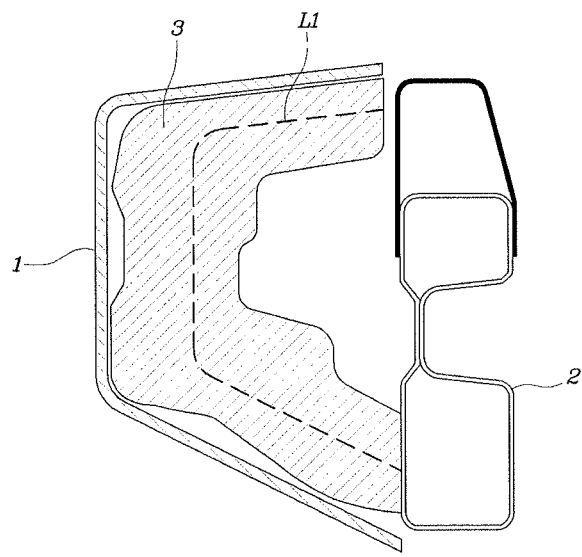
FIG. 1 is a view showing a conventional energy absorber for a vehicle.
Figure 2:
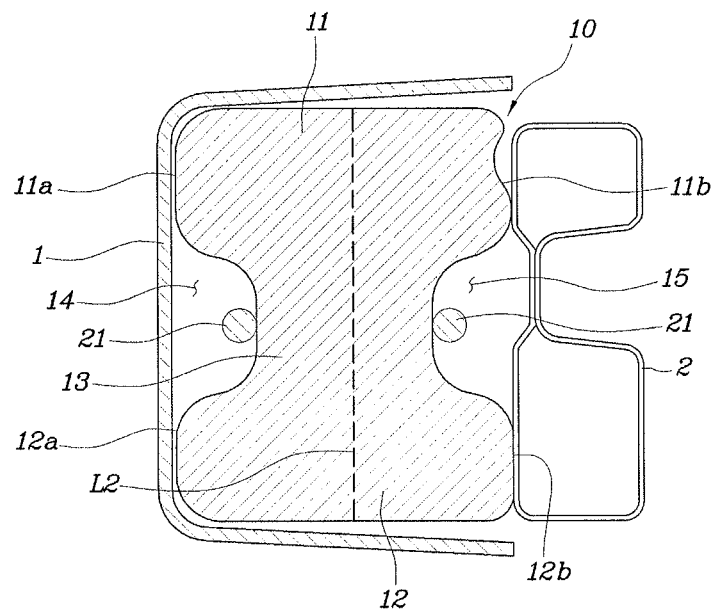
FIGS. 2 and 3 are views illustrating an exemplary energy absorber for a vehicle, according to the present invention.
Figure 3:
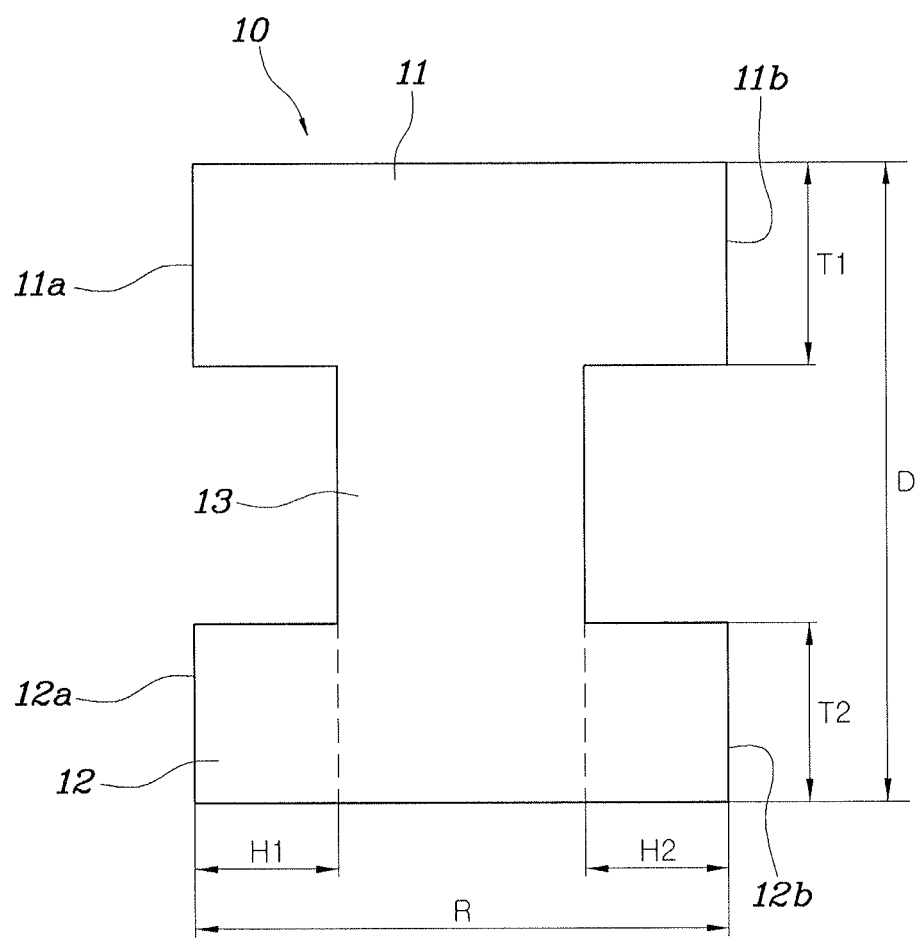

As shown in FIGS. 2 and 3, the energy absorber 10 according to the present invention is installed between a bumper cover 1 and a back beam 2 and functions to absorb the collision energy. The energy absorber 10 includes an upper or top absorption part 11, a lower or bottom absorption part 12 and a medial absorption part 13. The upper or top absorption part 11 extends in the lateral direction of the vehicle and is installed such that a first surface 11a and a second surface 11b thereof respectively face the bumper cover 1 and the back beam 2. The lower or bottom absorption part 12 is disposed below the upper or top absorption part 11 and has a first surface 12a and a second surface 12b which are oriented in the same directions as the upper or top absorption part 11. The medial absorption part 13 connects the upper or top absorption part 11 to the lower or bottom absorption part 12. The upper or top and lower or bottom absorption parts 11 and 12 and the medial absorption part 13 are integrated into a single body in an I-shaped cross-sectional shape.

In the energy absorber 10 having the I-shaped cross-section according to the present invention, a cross-sectional length (designated by the dashed line L2 of FIG. 2) from the upper absorption part 11 to the lower absorption part 12 is markedly shorter than that of the conventional energy absorber 3 having the C-shaped cross-sectional structure.

Therefore, the energy absorber 10 having the I-shaped cross-sectional structure according to the present invention can prevent a buckling phenomenon attributable to the collision energy. Thereby, the present invention can also prevent peripheral parts from being affected by the buckling of the energy absorber 10.

When a vehicle collision occurs, the energy absorber 10 according to the present invention is not involved in a buckling phenomenon. Hence, the performance with which the collision energy is absorbed can be further enhanced. Particularly, when the vehicle collides with a pedestrian, the present invention can markedly reduce the degree of injury suffered by the pedestrian.

Meanwhile, a primary shock absorption space 14 is defined among the medial absorption part 13 and the first surfaces 11a and 12a of the upper and lower absorption parts 11 and 12. A secondary shock absorption space 15 is defined among the medial absorption part 13 and the second surfaces 11b and 12b of the upper and lower absorption parts 11 and 12.

The primary shock absorption space 14 and the secondary shock absorption space 15 provide a space which allows the energy absorber 10 to be deformed by the collision energy generated from the collision accident. That is, the energy absorber 10 is deformed in the primary and secondary shock absorption spaces 14 and 15 and is able to sufficiently absorb the collision energy.

Further, if a sensor that is an electronic device for vehicles is installed in the bumper cover 1, an electric wire 21 that is for supplying power must be connected to the sensor. In the present invention, wiring the electric wire 21 can make use of the primary shock absorption space 14 of the secondary shock absorption space 15.

In other words, in the energy absorber 10 having the I-shaped cross-sectional structure according to the present invention, the electric wire 21 that is connected to the sensor can be arranged in the primary or secondary shock absorption space 14 or 15 which functions as extra space. Therefore, the advantage of a separate path for connecting the electric wire 21 to the sensor not being required may be obtained.

The upper and lower absorption parts 11 and 12 and the medial absorption part 13 according to the present invention are of a foamed product that is formed into a single body using a synthetic resin such as polyolefin resin, polystyrene resin, polyester resin, polycarbonate resin, etc. Particularly, the energy absorber 10 of the present invention may be a foamed body made of polyolefin resin to provide high strength, flexibility, superior ability to absorb shock, durability and superior compressibility.

Furthermore, the upper and lower absorption parts 11 and 12 and the medial absorption part 13 have an apparent density ranging from 0.025 g/cm² to 0.035 g/cm².

That is, if the apparent density of the energy absorber 10 of the present invention is excessively high, as the compressive load thereof increases, the degree of injury of a pedestrian who collides with the vehicle also increases. On the contrary, if the apparent density of the energy absorber 10 is excessively low, there is a disadvantage in that the volume of the absorber 10 must be increased to enhance the ability to absorb the collision energy.

Therefore, the apparent density of the energy absorber 10 of the present invention may range from 0.025 g/cm² to 0.035 g/cm², providing sufficient ability to absorb the collision energy and protect the pedestrian.

Furthermore, the energy absorber 10 of the present invention is characterized in that the shapes of the upper absorption part 11, the lower absorption part 12 and the medial absorption part 13 satisfy the following Equations 1 and 2.

$$2 \text{ mm} < R/H1 \text{ or } R/H2 < 4 \text{ mm} \quad \text{Equation 1)}$$

$$2 \text{ mm} < D/T1 \text{ or } D/T2 < 4 \text{ mm} \quad \text{Equation 2)}$$

Here, R denotes a length from the first surface 11a or 12a of the upper or lower absorption part 11 or 12 to the second surface 11b or 12b. H1 denotes a length from the first surface 11a or 12a of the upper or lower absorption part 11 or 12 to the medial absorption part 13. 142 denotes a length from the second surface 11b or 12b of the upper or lower absorption part 11 or 12 to the medial absorption part 13. D denotes a height from an upper surface of the upper absorption part 11 to a lower surface of the lower absorption part 12. T1 denotes a thickness of the upper absorption part 11. T2 denotes a thickness of the lower absorption part 12.

The reason why the energy absorber 10 having the I-shaped cross-sectional structure according to the present invention complies with the above-mentioned conditions is because it can sufficiently absorb collision energy and thus protect the pedestrian.

As described above, an energy absorber for a vehicle according to the present invention has an I-shaped cross-sectional structure so that a buckling phenomenon can be prevented from occurring when the vehicle is involved in a collision, thus preventing peripheral parts from being damaged, and making it possible to absorb a sufficient amount of the collision energy. Moreover, the present invention can markedly enhance the ability to protect a pedestrian when the vehicle collides with the pedestrian.

Furthermore, in the energy absorber having the I-shaped cross-sectional structure according to the present invention, an electric wire that is connected to a sensor is arranged in primary and secondary shock absorption spaces which function as extra space. Thus, the present invention does not require a separate installation space in which to arrange the electric wire.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An energy absorber installed between a bumper cover and a back beam of a vehicle to absorb a collision energy, the energy absorber comprising:
   a top absorption part extending in a lateral direction of the vehicle, the top absorption part being oriented such that a first surface and a second surface thereof respectively face the bumper cover and the back beam;
   a bottom absorption part disposed below the top absorption part, the bottom absorption part having a first surface and a second surface that are respectively oriented in same directions as the first and second surfaces of the top absorption part; and
   a medial absorption part connecting the top absorption part to the bottom absorption part;
   wherein the top and bottom absorption parts and the medial absorption part form a single body having an I-shaped cross-sectional shape, and the single body type energy absorber including the top and bottom absorption parts and the medial absorption part matches the height of the back beam along a length of the back beam; and
   wherein shapes of the top absorption part, the bottom absorption part and the medial absorption part satisfy Equations 1 and 2 as follows:

$$2\ mm < R/H1\ or\ R/H2 < 4\ mm \qquad \text{Equation 1)}$$

$$2\ mm < D/T1\ or\ D/T2 < 4\ mm \qquad \text{Equation 2)}$$

where, R denotes a length from the first surface of the top or bottom absorption part to the second surface thereof, H1 denotes a length from the first surface of the top or bottom absorption part to the medial absorption part, H2 denotes a length from the second surface of the top or bottom absorption part to the medial absorption part, D denotes a height from a top surface of the top absorption part to a bottom surface of the bottom absorption part, T1 denotes a thickness of the top absorption part, and T2 denotes a thickness of the bottom absorption part.

2. The energy absorber as set forth in claim 1, wherein a primary shock absorption space is defined among the medial absorption part and the first surfaces of the top and bottom absorption parts, and a secondary shock absorption space is defined among the medial absorption part and the second surfaces of the top and bottom absorption parts.

3. The energy absorber as set forth in claim 2, wherein an electric wire is arranged in the primary shock absorption space and the secondary shock absorption space, the electric wire being connected to a sensor installed in the bumper cover.

4. The energy absorber as set forth in claim 1, wherein the top and bottom absorption parts and the medial absorption part are of a foamed product that is formed into a single body and is made of synthetic resin.

5. The energy absorber as set forth in claim 4, wherein the synthetic resin comprises polyolefin resin foam.

6. The energy absorber as set forth in claim 4, wherein an apparent density of the top and bottom absorption parts and the medial absorption part ranges from 0.025 g/cm$^2$ to 0.035 g/cm$^2$.

* * * * *